(12) United States Patent
Yoneyama

(10) Patent No.: US 8,394,526 B2
(45) Date of Patent: Mar. 12, 2013

(54) CYLINDRICAL BATTERY AND MANUFACTURING METHOD THEREOF

(75) Inventor: Satoshi Yoneyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 235 days.

(21) Appl. No.: 12/740,037

(22) PCT Filed: Mar. 9, 2009

(86) PCT No.: PCT/JP2009/001045
§ 371 (c)(1),
(2), (4) Date: Apr. 27, 2010

(87) PCT Pub. No.: WO2009/133652
PCT Pub. Date: Nov. 5, 2009

(65) Prior Publication Data
US 2010/0255358 A1   Oct. 7, 2010

(30) Foreign Application Priority Data
Apr. 28, 2008   (JP) ................. 2008-117417

(51) Int. Cl.
*H01M 2/26* (2006.01)
*H01M 4/13* (2010.01)

(52) U.S. Cl. .......... 429/161; 429/94; 429/211; 29/623.1

(58) Field of Classification Search .......... 429/121–347, 429/94
See application file for complete search history.

(56) References Cited

U.S. PATENT DOCUMENTS
2002/0150816 A1 * 10/2002 Sakai et al. .......... 429/94
2007/0020518 A1 * 1/2007 Bito et al. .......... 429/181
2008/0166630 A1   7/2008 Okabe et al.

FOREIGN PATENT DOCUMENTS
| JP | 2000-106165 | 4/2000 |
| JP | 2005-100949 | 4/2005 |
| JP | 2006-100214 | 4/2006 |
| JP | 2006-156135 | 6/2006 |
| JP | 2008-251207 | 10/2008 |

OTHER PUBLICATIONS

Japanese Office Action, issued in Japanese Patent Application No. 2008-117417 dated Apr. 12, 2012.

* cited by examiner

*Primary Examiner* — Basia Ridley
*Assistant Examiner* — James Lee
(74) *Attorney, Agent, or Firm* — McDermott Will & Emery LLP

(57) ABSTRACT

The present invention mainly relates to a cylindrical battery provided with a wound-type electrode plate group, and to a manufacturing method thereof. An object of the present invention is to provide a manufacturing method by which a cylindrical battery can be produced at high productivity, without a welding electrode attaching to a current collector plate during connection of the current collector plate to a battery case. In the present invention, the maximum diameter of a hollow cylindrical portion of an electrode plate group is ⅙ or more and ⅖ or less of that of the electrode plate group; and a current collector having one first projection and a plurality of second projections are used. The one projection and the plurality of second projections are disposed on a face of the current collector plate facing an inner bottom face of the battery case, and protrude toward the inner bottom face side of the battery case. The height of the first projection is higher than that of the second projection. Further, the welding electrode used during connection of the current collector plate to the battery case has a maximum diameter of 60% or more and 100% or less of that of the hollow cylindrical portion of the electrode plate group, and is 4 mm.

5 Claims, 3 Drawing Sheets

CYLINDRICAL BATTERY AND MANUFACTURING METHOD THEREOF

RELATED APPLICATIONS

This application is the U.S. National Phase under 35 U.S.C. §371 of International Application No. PCT/JP2009/001045, filed on Mar. 9, 2009, which in turn claims the benefit of Japanese Application No. 2008-117417, filed on Apr. 28, 2008, the disclosures of which Applications are incorporated by reference herein.

TECHNICAL FIELD

The present invention mainly relates to a cylindrical battery provided with a wound-type electrode plate group and to a manufacturing method thereof.

BACKGROUND ART

Batteries such as nickel-cadmium batteries and nickel-metal hydride batteries are known as cylindrical batteries. Cylindrical batteries are typically provided with an electrode plate group, obtained by stacking a positive electrode and a negative electrode each in strip form with a separator therebetween for separation, and then spirally winding a stacked body thus obtained. The electrode plate group is housed in a cylindrical battery case made of metal.

Cylindrical batteries as such are highly reliable and capable of easy maintenance, and are used for many purposes such as the power source for cell phones, laptop computers, and the like. In recent years, there is a demand for development of cylindrical batteries suited for high current discharge, as the power source for electrically-assisted bicycles, lawn-mowers, electric vehicles, and the like.

Known as a current collecting structure suited for input and output of large currents is, for example, a current collecting structure in which a positive electrode core member and a negative electrode core member protrude from the upper end face and the lower end face of an electrode plate group, respectively, multiple points on the end edge portion of the positive electrode core member are welded to a positive electrode current collector, and multiple points on the end edge portion of the negative electrode core member are welded to a negative electrode current collector.

Further, Patent Literature 1 proposes a negative electrode current collector provided with a plurality of projections. In Patent Literature 1, the negative electrode current collector is disposed between an electrode plate group and the inner bottom face of a battery case, one projection is provided on the center part of the negative electrode current collector positioned correspondingly to the hollow cylindrical portion of the electrode plate group, and a plurality of projections are provided on the area between the center part and the peripheral edge portion of the negative electrode current collector. The plurality of projections protrude from the face of the negative electrode current collector facing the inner bottom face of the battery case, toward the inner bottom face of the battery case. The plurality of projections of the negative electrode current collector are welded to the inner bottom face of the battery case. A negative core member is connected to the face opposite to the face of the negative electrode current collector provided with the projections. In Patent Literature 1, the height of the projection provided on the center part of the negative electrode current collector positioned correspondingly to the hollow cylindrical part is lower than those of the projections provided on other parts of the negative electrode current collector.

[Citation List]

[Patent Literature]

[PTL 1] Japanese Laid-Open Patent Publication No. 2005-100949

SUMMARY OF INVENTION

Technical Problem

However, in an art as disclosed in Patent Literature 1, the welding current passed through the welding electrode to the welding portion is large, for spot welding the plurality of projections provided on the current collector plate to the inner bottom face of the battery case. Therefore, if a thin welding electrode is used, a problem occurs in which heat is generated at the tip of the welding electrode during welding, thus causing the welding electrode to attach to the current collector plate due to fusion caused therebetween. Further, a problem also occurs in which productivity declines, since work is required to detach the welding electrode from the attached portion.

An object of the present invention is to mainly provide in view of the problem mentioned above, a method for welding a current collector plate to a battery case while enabling high productivity, without the welding electrode attaching to the current collector plate even in the case where a large current is passed to the welding electrode for welding the current collector plate to the battery case.

Solution to Problem

A manufacturing method of a cylindrical battery in accordance with the present invention comprises the steps of:

(a) producing a first electrode including a first core member in strip form and a first active material layer disposed on the first core member, with an exposed portion of the first core member provided along one side parallel to the longitudinal direction of the first core member;

(b) producing a second electrode including a second core member in strip form and a second active material layer disposed on the second core member, with an exposed portion of the second core member provided along one side parallel to the longitudinal direction of the second core member;

(c) spirally winding a stacked body including the first electrode, the second electrode, and a separator interposed therebetween to obtain an electrode plate group in which the exposed portion of the first core member and the exposed portion of the second core member are disposed on two end faces of the electrode plate group in the winding axis direction, respectively, and a hollow cylindrical portion is provided along the winding axis thereof;

(d) connecting a first current collector plate to the exposed portion of the first core member;

(e) connecting a second current collector plate to the exposed portion of the second core member;

(f) housing in a cylindrical battery case, the electrode plate group to which the first current collector plate and the second current collector plate are connected, so that the second current collector plate is in contact with an inner bottom face of the cylindrical battery case; and (g) connecting the second current collector plate to the cylindrical battery case. The second current collector plate has on a face thereof facing the inner bottom face of the cylindrical battery case, one first projection and a plurality of second projections protruding toward the inner bottom face side of the cylindrical battery case, respectively. The first projection is disposed on a first part of the second current collector plate positioned correspondingly to the hollow cylindrical portion of the electrode plate group, the plurality of second projections are disposed on a second part other than the first part of the second current collector, and the height of the first projection is higher than that of the second projection. The step (g) includes a step of passing a welding electrode through the hollow cylindrical portion of the electrode plate group to come in contact with the second current collector plate and then welding together the second current collector plate and the cylindrical battery case by using the welding electrode in a state where the second current collector and the cylindrical battery case are in close contact. The maximum diameter of the hollow cylindrical portion of the electrode plate group is ⅙ or more and ⅔ or less of that of the electrode plate group. The maximum diameter of the welding electrode is 60% or more and 100% or less of the maximum diameter of the hollow cylindrical portion of the electrode plate group, and is 4 mm or more.

Here, the respective maximum diameters of the electrode plate group and the hollow cylindrical portion are those in the direction perpendicular to the winding axis. The maximum diameter of the welding electrode is that in the direction perpendicular to the longitudinal direction.

The second projections are preferably disposed on a circumference whose center is at a point of intersection between the winding axis of the electrode plate group and the second current collector plate, and whose diameter is 50 to 80% of the maximum diameter of the electrode plate group.

The difference between the height of the first projection and that of the second projection is preferably 10 to 500 μm.

The maximum diameter of the electrode plate group is preferably 20 to 40 mm.

In addition, the present invention relates to a cylindrical battery manufactured by the manufacturing method mentioned above. Specifically, the cylindrical battery of the present invention comprises:

(i) a wound-type electrode plate group including a first electrode, a second electrode, and a separator interposed therebetween;

(ii) a cylindrical battery case housing the wound-type electrode plate group;

(iii) a first current collector plate connected to the first electrode;

(iv) a second current collector plate connected to the second electrode, and disposed between the electrode plate group and an inner bottom face of said cylindrical battery case; and (v) an electrolyte. The first electrode includes a first core member in strip form and a first active material layer disposed on the first core member, in which an exposed portion of the first core member is provided along one side parallel to the longitudinal direction of the first core member. The second electrode includes a second core member in strip form and a second active material layer disposed on the second core member, in which an exposed portion of the second core member is provided along one side parallel to the longitudinal direction of the second core member. The exposed portion of the first core member and the exposed portion of the second core member are disposed on two end faces of the electrode plate group in the winding axis direction, respectively, and the electrode plate group has a hollow cylindrical portion along the winding axis thereof. The second current collector plate has on a face thereof facing the inner bottom face of the cylindrical battery case, one first projection and a plurality of second projections protruding toward the inner bottom face side of the cylindrical battery case, respectively. The first projection is disposed on a first part of the second current collector plate positioned correspondingly to the hollow cylindrical portion of the electrode plate group, and the plurality of second projections are disposed on a second part other than the first part of the second current collector. The first projection and the plurality of second projections provided on the second current collector plate, respectively, are welded to the inner bottom face of the cylindrical battery case, and the maximum diameter of the hollow cylindrical portion of the electrode plate group is ⅙ or more and ⅔ or less of that of the electrode plate group.

The second projections are preferably disposed on a circumference whose center is at a point of intersection between the winding axis of the electrode plate group and the second current collector plate, and whose diameter is 50 to 80% of the maximum diameter of the electrode plate group.

The maximum diameter of the electrode plate group is preferably 20 to 40 mm.

Advantageous Effects of Invention

In the present invention, the maximum diameter of the hollow cylindrical portion of the electrode plate group is larger than in conventional art. Further, the plurality of projections are provided on the current collector plate disposed between the inner bottom face of the battery case and the electrode plate group, and also, the height of the projection provided on the center portion of the current collector plate is higher than those of the projections provided on other areas. Thus, according to the manufacturing method of the present invention, the maximum diameter of the welding electrode used for welding the current collector plate to the battery case can be larger, and also, the current collector plate and the battery case can be easily connected electrically due to the projections. Further, battery manufacturing can be improved, since the welding electrode can be prevented from attaching to the current collector plate.

In addition, the manufacturing method of the present invention enables the current collector disposed between the battery case and the electrode plate group to be reliably connected to the battery case. Due to the above, the current collecting property can be improved. Thus, a cylindrical battery manufactured by the manufacturing method of the present invention has, and can maintain, excellent battery characteristics.

DESCRIPTION OF EMBODIMENTS

Figure 1:
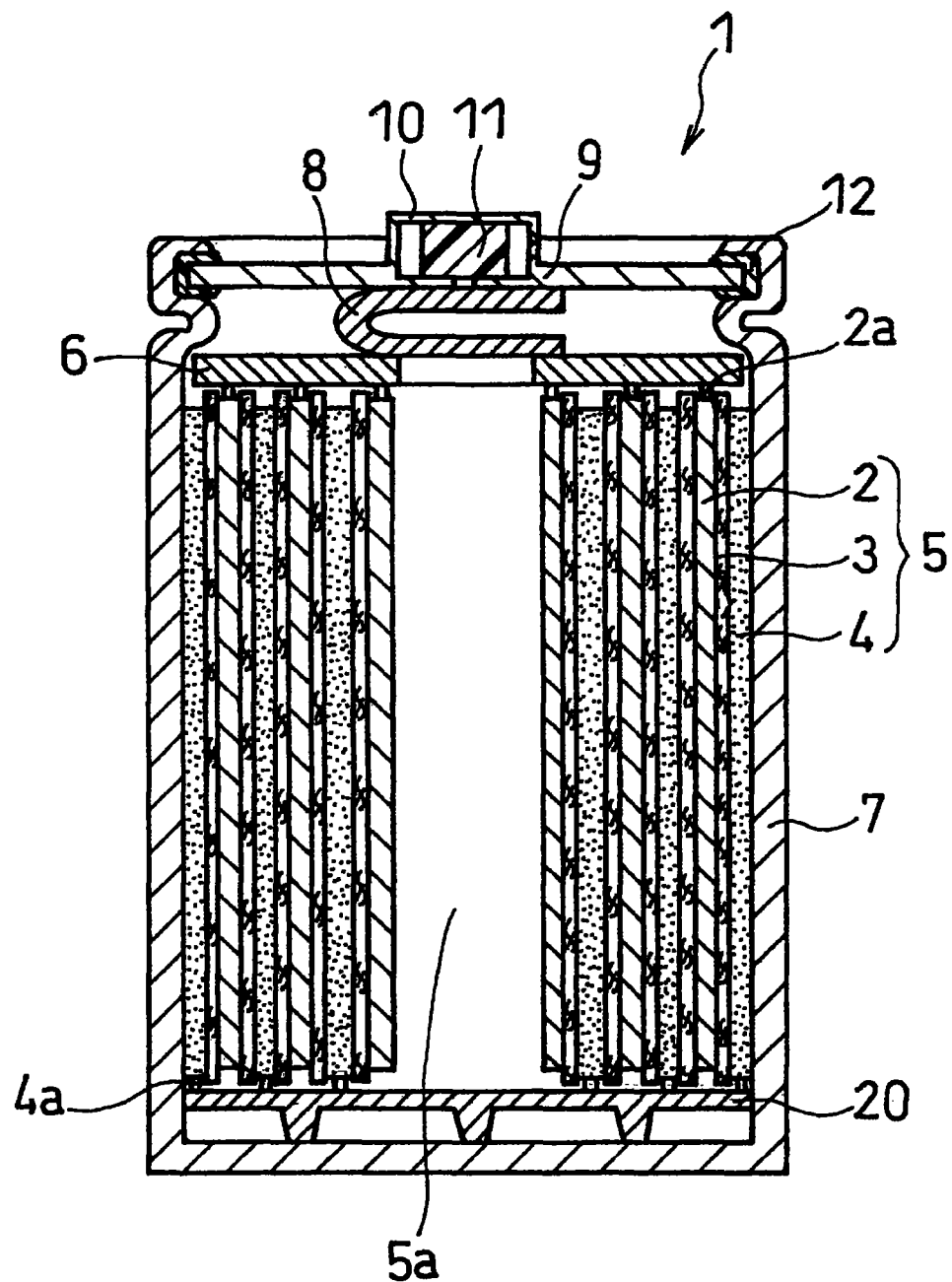
FIG. 1 A vertical sectional view schematically illustrating a cylindrical battery according to one embodiment of the present invention.

The present invention will be explained with reference to drawings.

A manufacturing method of a cylindrical battery in accordance with the present invention comprises the steps of:

(a) producing a first electrode including a first core member in strip form and a first active material layer disposed on the first core member, with an exposed portion of the first core member provided along one side parallel to the longitudinal direction of the first core member;

(b) producing a second electrode including a second core member in strip form and a second active material layer disposed on the second core member, with an exposed portion of the second core member provided along one side parallel to the longitudinal direction of the second core member;

(c) spirally winding a stacked body comprising the first electrode, the second electrode, and a separator interposed therebetween to obtain an electrode plate group in which the exposed portion of the first core member and the exposed portion of the second core member are disposed on two end faces of the electrode plate group in the winding axis direction, respectively, and a hollow cylindrical portion is provided along the winding axis thereof;

(d) connecting a first current collector plate to the exposed portion of the first core member;

(e) connecting a second current collector plate to the exposed portion of the second core member;

(f) housing in a cylindrical battery case, the electrode plate group to which the first current collector plate and the second current collector plate are connected, so that the second current collector plate is in contact with an inner bottom face of the cylindrical battery case; and (g) connecting the second current collector plate to the cylindrical battery case. The second current collector plate has on a face thereof facing the inner bottom face of the cylindrical battery case, one first projection and a plurality of second projections protruding toward the inner bottom face side of the cylindrical battery case, respectively. The first projection is disposed on a first part of the second current collector plate positioned correspondingly to the hollow cylindrical portion of the electrode plate group, and the plurality of second projections are disposed on a second part other than the first part of the second current collector. The height of the first projection is higher than that of the second projection. The maximum diameter of the hollow cylindrical portion of the electrode plate group is ⅙ or more and ⅔ or less of that of the electrode plate group.

Further, the step (g) comprises a step of passing a welding electrode through the hollow cylindrical portion of the electrode plate group to come in contact with the second current collector plate and then welding together the second current collector plate and the cylindrical battery case by using the welding electrode in a state where the second current collector plate and the cylindrical battery case are in close contact. The maximum diameter of the welding electrode is 60% or more and 100% or less of that of the hollow cylindrical portion of the electrode plate group, and is 4 mm or more.

By the manufacturing method of the present invention, for example, a cylindrical battery 1 as illustrated in FIG. 1 can be manufactured. In the following, an explanation will be made on the case of manufacturing the cylindrical battery 1 as illustrated in FIG. 1 by using the manufacturing method of the present invention. However, a battery manufactured by the manufacturing method of the present invention is not limited to the cylindrical battery of FIG. 1.

A first electrode 2 and a second electrode 4 each in strip form are produced in the steps (a) and (b), respectively. The first electrode 2 includes a first core member in strip form, and a first active material layer disposed on the first core member. On the first electrode 2, an exposed portion 2a of the first core member is provided on the side parallel to the longitudinal direction of the first electrode 2. Likewise, the second electrode 4 includes a second core member in strip form, and a second active material layer disposed on the second core member. On the second electrode 4, an exposed portion 4a of the second core member is provided on the side parallel to the longitudinal direction of the second electrode 4.

There is no particular limitation to the width of the exposed portion 2a of the first core member in the direction perpendicular to the longitudinal direction of the first electrode 2, as long as a connection can be made between the exposed portion 2a of the first core member and a first current collector plate 6. The width is preferably 1 to 2 mm, for example. Likewise, there is no particular limitation to the width of the exposed portion 4a of the second core member in the direction perpendicular to the longitudinal direction of the second electrode 4, but the width is preferably 1 to 2 mm.

In the case where the battery 1 manufactured by the manufacturing method of the present invention is an alkaline storage battery for example, there is no particular limitation to the respective types of the first electrode 2 and the second electrode 4. For example, the first electrode 2 and the second electrode 4 may be sintered electrodes. Alternatively, the first electrode 2 and the second electrode 4 may be non-sintered electrodes such as electrodes (material mixture-type electrodes) obtained by applying a paste mixture containing an active material to a core member, followed by drying. Further alternatively, the first electrode 2 may be a sintered electrode and the second electrode 4 may be a material mixture-type electrode. The first and second core members may be porous metals. The respective thickness of the first and second active material layers are determined as appropriate depending on battery capacity and the like.

Sintered electrodes and material mixture-type electrodes can be produced by using known methods in the art.

In the case of manufacturing a lithium secondary battery, the first electrode 2 and the second electrode 4 can be for example, but are not limited to, material mixture-type electrodes, respectively.

In the step (c), an electrode plate group 5 is produced by using the first electrode 2 and the second electrode 4 obtained as mentioned above, respectively. Specifically, a wound body is obtained by winding around a predetermined winding core, a stacked body including the first electrode 2, the second electrode 4, and a separator 3 interposed therebetween. By removing the winding core from the wound body, the electrode plate group 5 having a hollow cylindrical portion 5a provided along the winding axis thereof can be obtained. The maximum diameter of the hollow cylindrical portion 5a provided in the electrode plate group 5 is ⅙ or more or ⅔ or less of that of the electrode plate group 5.

The maximum diameter of the cross section of the hollow cylindrical portion 5a provided in the electrode plate group 5 can be controlled by adjusting the maximum diameter of the cross section of the winding core.

In the stacked body, the exposed portion 2a of the first core member is disposed along one side parallel to the longitudinal direction of the stacked body, and the exposed portion 4a of the second core member is disposed along the other side parallel to the longitudinal direction of the stacked body. Disposing the exposed portion 2a of the first core member and the exposed portion 4a of the second core member as above allows the exposed portion 2a of the first core member and the exposed portion 4a of the second core member to be disposed on one end face (a first end face) and the other end face (a second end face) of the obtained electrode plate group 5 in the winding axis direction, respectively.

In the step (d), the first current collector plate 6 is connected to the exposed portion 2a of the first core member disposed on one end face (the first end face) of the electrode plate group 5. In the step (e), a second current collector plate 20 is connected to the exposed portion 4a of the second core member disposed on the other end face (the second end face) of the electrode plate group 5. Known methods in the art can be used for the connection of the first current collector plate 6 to the exposed portion 2a of the first core member and the connection of the second current collector plate 20 to the exposed portion 4a of the second core member in the steps (d) and (e), respectively, Next, in the step (f), the electrode plate group 5 to which the first current collector plate 6 and the second current collector plate 20 are connected, is housed in a cylindrical battery case 7 so that the second current collector plate 20 is in contact with the inner bottom face of the cylindrical battery case 7. Then, in the step (g), the second current collector plate 20 is connected to the cylindrical battery case 7.

Figure 2:
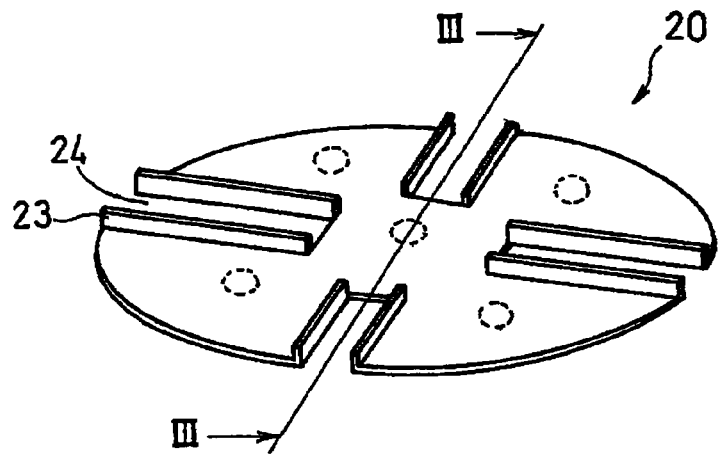
FIG. 2 A perspective view schematically illustrating a second current collector plate of the cylindrical battery included in one embodiment of the present invention.
Figure 3:
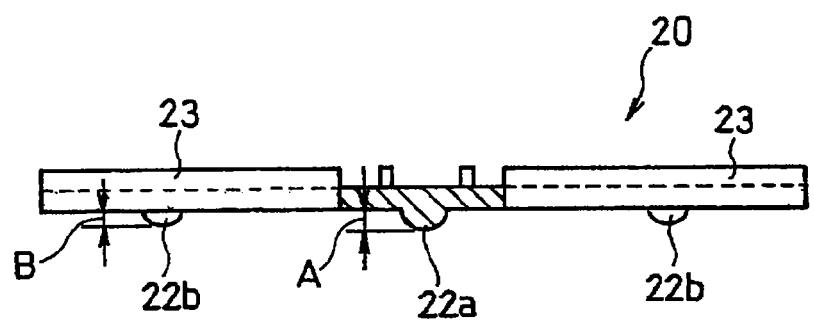
FIG. 3 A cross-sectional view along a line of the second current collector plate of FIG. 2.
Figure 4:
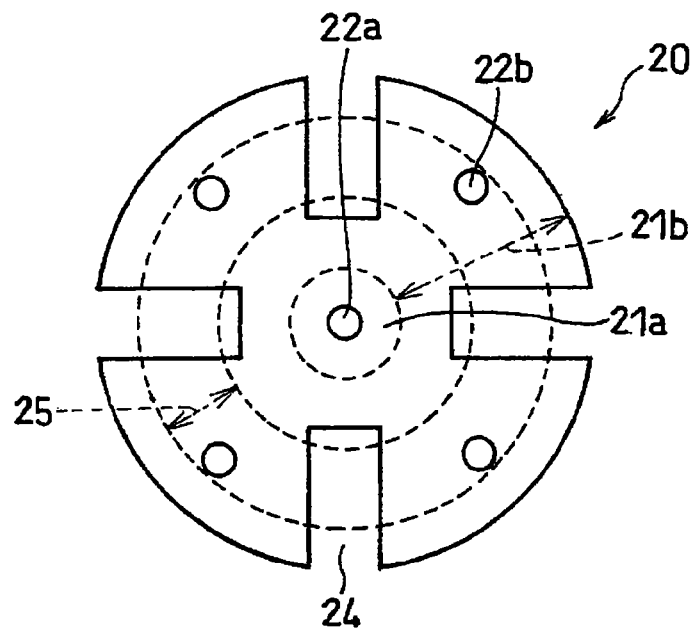
FIG. 4 A view when a face of the second current collector plate of FIG. 2 provided with projections is seen from a direction perpendicular to the face.

In the present invention, the second current collector plate 20 has a plurality of projections on the face thereof facing the inner bottom face of the battery case 7. One example of the second current collector plate 20 is illustrated in FIGS. 2 to 4. Here, FIG. 2 is a perspective view of one example of a second current collector plate. FIG. 3 is a cross-sectional view of the second current collector plate of FIG. 2 along a line III-III. FIG. 4 is a view of a face of the second current collector plate of FIG. 2 provided with projections, seen from a direction perpendicular to that face.

The second current collector plate 20 illustrated in FIGS. 2 to 4 has one first projection 22a provided on a first part 21a of the second current collector plate 20 positioned correspondingly to the hollow cylindrical portion 5a of the electrode plate group 5. Further, the second current collector plate 20 has a plurality of second projections 22b provided on a second part 21b other than the first part 21a of the second current collector plate 20. The height of the first projection 22a is higher than that of the second projection 22b.

Figure 5:
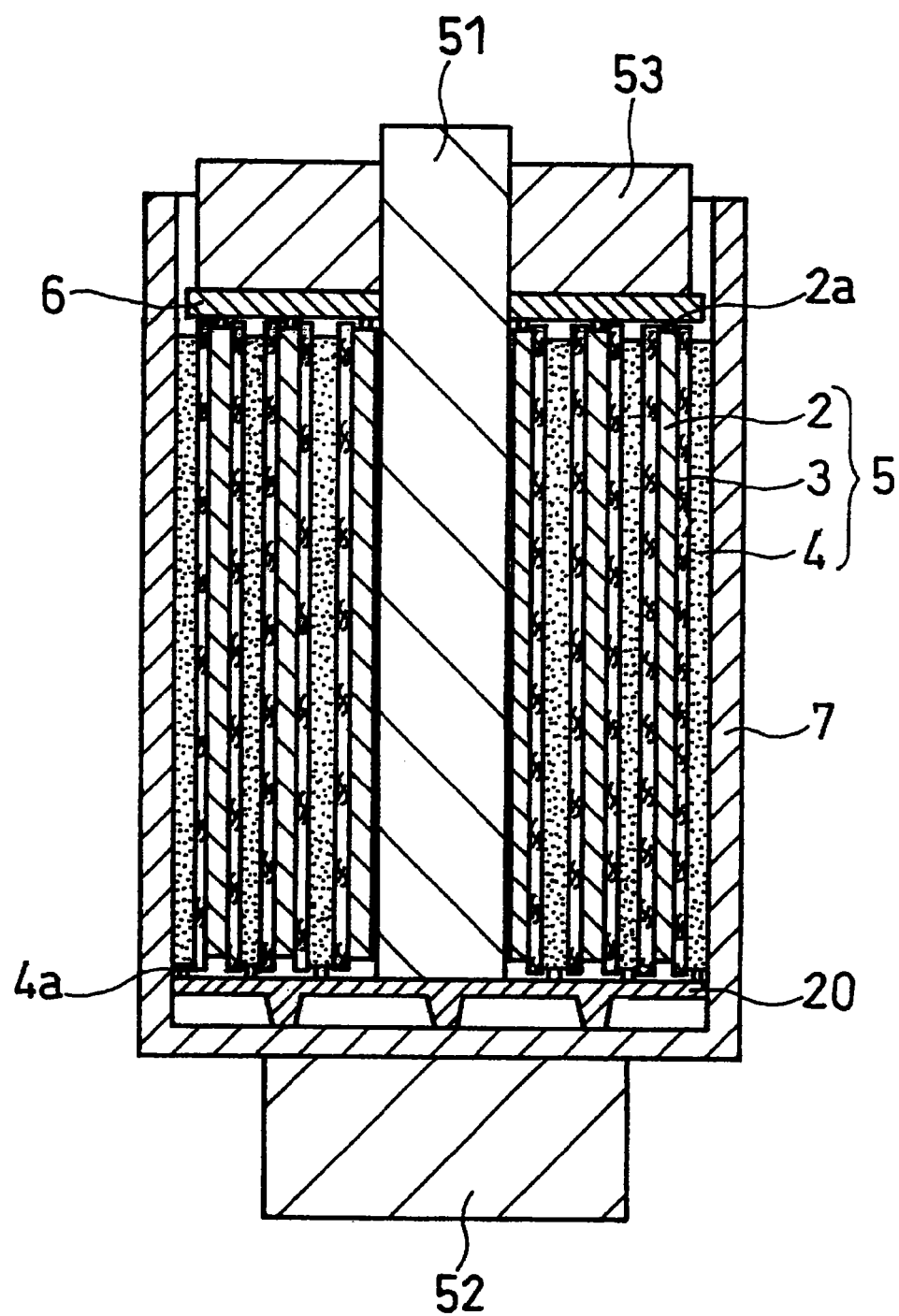
FIG. 5 A vertical sectional view schematically illustrating the position of a first welding electrode used for connecting a second current collector plate to a battery case.

The second current collector plate 20 is connected to the battery case 7 in the following manner. As illustrated in FIG. 5, a first welding electrode 51 is passed through the hollow cylindrical portion 5a of the electrode plate group 5 to come in contact with the second current collector plate 20, and a second welding electrode 52 is brought into contact with a bottom face of the battery case 7. The second current collector plate 20 and the battery case 7 are brought into close contact by using the first welding electrode 51 and the second welding electrode 52, and in this state, current is applied between the first welding electrode 51 and the second welding electrode 52. As the above, the second current collector plate 20 is resistance welded to, and thus connected to the battery case 7. The current value applied between the first welding electrode 51 and the second welding electrode 52 can be, for example, 2 to 6 kA.

In the present invention, the maximum diameter of the hollow cylindrical portion 5a of the electrode plate group 5 is ⅙ or more and ⅖ or less of that of the electrode plate group 5, and the maximum diameter of the first welding electrode 51 is 60% or more up to 100% of that of the hollow cylindrical portion 5a and is 4 mm or more. That is, the respective maximum diameters of the hollow cylindrical portion 5a of the electrode plate group 5 and the first welding electrode 51 are larger than in conventional art. Conventionally, in the case of producing an electrode plate group with a maximum diameter of about 30 mm, a winding core with a diameter smaller than 5 mm is used, and thus, the maximum diameter of the hollow cylindrical portion formed also becomes smaller than 5 mm. Consequently, a first welding electrode with a diameter smaller than that of the winding core had been used.

As mentioned above, the use of the first welding electrode 51 with a maximum diameter larger than in conventional art enables pressure to be stably applied to the second current collector plate 20. Due to the above, the second current collector plate 20 and the battery case 7 can be brought into closer contact. Further, heat dissipation during welding also improves since the maximum diameter of the first welding electrode 51 is larger. Thus, the first welding electrode 51 can be prevented from attaching to the second current collector plate 20 during welding. As a result, productivity of the battery can be improved. In addition, the first welding electrode 51 can be obtained with no or little work done on a commercially-available welding electrode, since the maximum diameter of the first welding electrode 51 is larger compared to that in conventional art.

The maximum diameter of the hollow cylindrical portion 5a is preferably ⅕ or more and ⅖ or less of that of the electrode plate group 5, since the effects mentioned above can be sufficiently obtained. The maximum diameter of the first welding electrode 51 is preferably 80 to 100% of that of the hollow cylindrical portion 5a.

The form of the first welding electrode 51 is not particularly limited. For example, a first welding electrode 51 can be used in cylindrical form.

Further, in the present invention, the one first projection 22a and the plurality of second projections 22b are provided on the first part 21a and the second part 21b, respectively, of the second current collector plate 20, and also, the height of the first projection 22a is higher than that of the second projection 22b.

In the step (step (c) mentioned above) of spirally winding the stacked body including the first electrode 2, the second electrode 4, and the separator 3 interposed therebetween, the exposed portions may become misaligned after each round of winding, depending on electrode deformations, variations in electrode thickness, accuracy of equipments, and the like. In this case, the end face of the electrode plate group 5 in the winding axis direction may not be flat, with a part of the exposed portions of the core members protruding or another part of the core members recessing. The second current collector plate 20 hardly becomes flat, when connected to the end face (exposed portions of the core members) as the above.

In the present invention, stable nuggets (welded portion) can be formed without being affected by the flatness and/or the flat state of the end plates of the electrode plate group 5 in the winding axis direction. This is due to realizing the state of favorably brining the second current collector plate 20 into close contact with the battery case 7 by using the first welding electrode 51 that is thick, and also due to allowing the height of the first projection 22a be higher than that of the second projection 22b. That is, by allowing the height of the first projection 22a be higher than that of the second projection 22b, the second current collector plate 20 reliably comes in contact with the battery case 7, and a current path can thus be secured. Due to the above, a stable state of connection can be maintained between the second current collector plate 20 and the battery case 7. As a result, a battery which maintains high battery performance can be obtained.

As the above, a battery with high battery performance can be obtained with high productivity by using the manufacturing method of the present invention.

If the maximum diameter of the hollow cylindrical portion 5a of the electrode plate group 5 is larger than ⅔ of that of the electrode plate group 5, sufficient capacity cannot be obtained.

Iron (Fe) and nickel (Ni) can be used, for example, as components of the second current collector plate 20 and the battery case 7. The first current collector plate 6 is also preferably constituted from the components mentioned above.

Four second projections 22b are provided on the second current collector plate 20 illustrated in FIG. 2, but the number of the second projections 22b is not particularly limited. As will be explained below, in the case where slits and burring portions are provided on the second current collector plate 20, the second projection 22b is provided in between slits. In the case where a plurality of slits are provided on the second current collector plate 20, the conductivity of the second current collector plate 20 is considered to degrade. Thus, the number of the second projections 22b is preferably 3 to 8, with consideration to the number of slits provided on the second current collector plate 20 and the like.

On the second current collector plate 20, the second projections 22b are preferably disposed at equally-spaced intervals (central angle of)90° on a concentric circle. In addition, the second projections 22b are preferably disposed on a region 25 (region between two circumferences drawn with broken lines) within the second part 21b positioned correspondingly to the part of the electrode plate group 5, the region 25 being 50 to 80% of the maximum diameter of the electrode plate group 5. Of the above, the second projections 22b are particularly preferably disposed on a region within the second part 21b, which is 65 to 70% of the maximum diameter of the electrode plate group 5. That is, the second projections 22b are preferably disposed on the second current collector 20, on a circumference whose center is at a point of intersection between the winding axis of the electrode plate group 5 and the face (lower face) of the second current collector plate 20 provided with the projections, and whose diameter is 50 to 80% of the maximum diameter of the electrode plate group 5. Further, the second projections 22b are particularly preferably disposed on a circumference whose center is at a point of intersection between the winding axis of the electrode plate group and the lower face of the second current collector plate 20, and whose diameter is 65 to 70% of the maximum diameter of the electrode plate group 5. By providing the second projections 22b on the region 25, further improvements can be made in welding property as well as in current collecting property after welding.

The difference between a height A of the first projection 22a and a height B of the second projection 22b: A-B, is preferably 10 to 500 μm depending on battery size, battery form, and the like. The height of the first projection 22a is preferably 100 to 600 μm. The height of the first projection 22a can be obtained as a perpendicular distance, from the face of the second current collector 20 provided with the first projection 22a, to the highest position of the first projection 22a. The height of the second projection 22b can also be obtained in the same manner as that of the first projection 22a.

The respective maximum diameters of the first projection 22a and the second projection 22b are further preferably 0.1 to 2 mm. Here, by the respective maximum diameters of the first projection 22a and the second projection 22b are meant those perpendicular to the height direction each thereof.

It is satisfactory if the center of the first projection 22a is within the first part 21a. In addition, to dispose the second projection 22b within the region 25 is meant to have the center thereof be within the region 25. Here, the respective centers of the first projection 22a and the second projection 22b are meant those of the maximum diameters each thereof.

The second current collector plate 20 can be produced by providing the one first projection 22a on the first part 21a of the second current collector plate 20; and the plurality of the second projections 22b on the second part 21b of the second current collector plate 20. The first projection 22a and the second projection 22b can be produced by using known methods in the art, respectively.

The second current collector plate 20 preferably has a plurality of burring portions 23. The burring portion 23 protrudes upwards from a side edge portion of a slit 24, four of which are formed radially from the center portion of the second current collector portion 20 toward the outer peripheral side thereof. The burring portion 23 is welded to the exposed portion 4a of the core member of the second electrode 4 included in the electrode plate group 5 in a state where the burring portion 23 is wedged in the exposed portion 4a of the core member of the second electrode 4, thus enabling low resistance connection between the second electrode 4 and the second current collector plate 20.

When connecting the second current collector plate 20 and the battery case 7, the first welding electrode 51 may be used, and also, a pressing means 53 such as for example, a pressing device may be used for pressing the electrode plate group 5 to the battery case 7 from top of the first current collector plate 6. This enables close contact between the second current collector plate 20 and the battery case 7. The pressing means 53 is provided with a through-hole for the first welding electrode 51 to pass therethrough.

An electrolyte (not illustrated) is injected in the battery case 7 after the second current collector plate 20 is connected to the battery case 7. Then, the opening of the battery case 7 is sealed by using a sealing plate 9 provided with a cap 10 having a first terminal, and a battery is thus manufactured. The first current collector plate 6 and the sealing plate 9 are connected by a connecting lead 8. An insulating gasket 12 is disposed between the battery case 7 and the sealing plate 9. FIG. 1 illustrates a battery including a sealing plate 9 having a rubber safety valve provided with a rubber member 11.

In the present invention, the first electrode 2 may be either a positive electrode or a negative electrode. The second electrode 4 is the negative electrode when the first electrode 2 is the positive electrode, and is the positive electrode when the first electrode 2 is the negative electrode.

Particularly, it is preferable that the second electrode 4 is the negative electrode and the second current collector plate 20 is the negative electrode current collector plate. For example, in aqueous secondary batteries such as alkaline storage batteries, a negative electrode active material needs to be filled in the negative electrode so that the negative electrode capacity becomes larger than the positive electrode capacity, to enable oxygen generated during charge/discharge to be absorbed in the negative electrode. As a result, the length of the negative electrode becomes longer than that of the positive electrode. Due to the above, the outermost portion of the electrode plate group 5 in contact with the battery case 7 inherently becomes the negative electrode. Thus, it is more preferable that the second electrode 4 is the negative electrode.

There is no particular limitation to the type of battery manufactured by using the manufacturing method of the present invention. The first core member and the first active material constituting the first electrode 2 and the second core member and the second active material constituting the second electrode 4 are selected as appropriate depending on the type of battery manufactured.

For example, in the case of manufacturing an alkaline storage battery, a material known in the art such as nickel oxyhydroxide can be used as the positive electrode active material. A material known in the art such as a hydrogen-absorbing alloy can be used as the negative electrode active material.

In the case of manufacturing a lithium secondary battery, a material known in the art such as a lithium-containing composite oxide can be used as the positive electrode active material. A material known in the art such as a material containing a carbon material, Si, or Sn can be used as the negative electrode active material.

The electrolyte used is also selected as appropriate depending on the type of battery manufactured. An alkaline aqueous solution, for example, is used as the electrolyte for an alkaline storage battery. A non-aqueous electrolyte comprising a non-aqueous solvent in which a lithium salt is dissolved therein, for example, is used as the electrolyte of a lithium battery. Materials known in the art can be used as the non-aqueous solvent and the lithium salt.

Further, also with respect to the positive electrode core member, the negative electrode core member, the separator, and the like, materials known in the art are used as appropriate depending on the type of battery manufactured.

The manufacturing method of the present invention is particularly suited to manufacture a battery including an electrode plate group whose vertical cross-section has a maximum diameter of 20 to 40 mm.

In addition, the second current collector plate 20 and the battery case 7 are connected with excellent weld quality due to the manufacturing method of the present invention. Thus, battery characteristics can be favorably maintained in a battery obtained by the manufacturing method of the present invention.

EXAMPLE

Next, the present invention will be explained with reference to an example. In the following example, a cylindrical nickel-metal hydride battery as illustrated in FIG. 1 was manufactured, with a first electrode as a positive electrode and a second electrode as a negative electrode. The diameter, height, and nominal capacity of the manufactured battery were 32 mm, 60 mm, and 6000 mAh, respectively.

A sintered nickel positive electrode plate in strip form with a thickness of 0.5 mm and a hydrogen-absorbing alloy negative electrode plate in strip form with a thickness of 0.3 mm, both typical in the art, were used. The positive electrode plate and the negative electrode plate were each provided with an exposed portion of a core member, on one side parallel to the longitudinal direction each thereof. The length of the exposed portion of the positive electrode core member in the width direction of the positive electrode plate was 1.5 mm. The length of the exposed portion of the negative electrode core member in the width direction of the negative electrode plate was 1.5 mm.

A stacked body was obtained by stacking the positive electrode plate and the negative electrode plate with a separator interposed therebetween. At this time, the exposed portion of the positive electrode core member was disposed along one side parallel to the longitudinal direction of the stacked body, and the exposed portion of the negative electrode core member was disposed along the other side parallel to the longitudinal direction of the stacked body. The exposed portion of the positive electrode core member and the exposed portion of the negative electrode core member protruded 1.5 mm in opposite directions of the width direction of the stacked body, respectively.

Next, the obtained stacked body was spirally wound, using a winding core with a thickness (cross-section diameter) of φ6 mm, thus obtaining an electrode plate group with a diameter (cross-section diameter) and height of 30 mm and 50 mm, respectively. On one face (a first end face) and the other face (a second end face) of the obtained electrode plate group in the winding axis direction, the exposed portion of the positive electrode core member and the exposed portion of the negative electrode core member were disposed, respectively. The maximum diameter of a hollow cylindrical portion provided along the winding axis at the center portion of the electrode plate group, was 5 mm. That is, the maximum diameter of the hollow cylindrical portion of the electrode plate group was ⅙ of that of the electrode plate group.

A rectangular iron positive electrode current collector plate (a first current collector plate) with a circular opening portion φ6 mm in diameter at the center portion thereof was welded to the exposed portion of the positive electrode core member disposed on the first end face of the electrode plate group. The diagonal length of the positive electrode current collector plate and the thickness thereof were 28 mm and 400 μm, respectively.

A circular iron negative electrode current collector plate (a second current collector plate) provided with one first projection and four second projections on one face thereof was prepared. The diameter and thickness of the negative electrode current collector plate were 29 mm and 400 μm, respectively.

The first projection was disposed on the center portion of the negative electrode current collector plate, that is, a first part thereof positioned correspondingly to the hollow cylindrical portion of the electrode plate group. The height and maximum diameter of the first projection were 380 μm and 180 μm, respectively.

The four second projections were disposed at equally-spaced intervals on a concentric circle with a diameter of 20 mm. The height and maximum diameter of the second projection were 300 μm and 150 μm, respectively.

The exposed portion of the negative electrode core member was connected to a face of the negative electrode current collector plate, on a side opposite to that on which the projections were formed. Specifically, a prismatic welding electrode with a 5 mm×8 mm corner was brought into contact with the negative electrode current collector plate, and the negative electrode current collector plate and the exposed portion of the negative electrode core member were electrically welded together.

The electrode plate group to which the positive and negative electrode current collector plates were welded was housed in an iron battery case. A cylindrical first welding electrode was passed through the opening portion provided at the center portion of the positive electrode current collector plate and through the hollow cylindrical portion of the electrode plate group, and brought into contact with the negative electrode current collector plate. The second welding electrode was brought into contact with the bottom portion of the battery case. The five projections of the negative electrode current collector plate and the battery case were brought into close contact by using the first and second welding electrodes. At this time, the electrode plate group was further pressed down to the battery case with a force of 150 N by an assembly pressing device, from the top of the first current collector plate. The negative electrode current collector plate was welded to the inner bottom face of the battery case by applying a welding current of 4 kA between the first and second welding electrodes. The maximum diameter of the first welding electrode was 4.0 mm. That is, the maximum diameter of the first welding electrode was 80% of that of the hollow cylindrical portion of the electrode plate group.

Next, a predetermined amount of a predetermined alkaline electrolyte was injected into the battery case from the opening portion at the center portion of the positive electrode current collector plate. Then, one end of a connecting lead made of nickel was connected to the positive electrode current collector plate, and the other end thereof was welded to a sealing plate provided with a positive electrode terminal. Then, the opening portion of the battery case was sealed with the sealing plate. The alkaline storage battery manufactured as thus was designated as battery "A".

Comparative battery "B" was manufactured in the same manner as battery "A", except for using a first welding electrode with a maximum diameter of 3 mm.

1000 batteries were manufactured for battery "A" and comparative battery "B", respectively, and the occurrence rates of the first welding electrode attaching to the negative electrode current collector plate were obtained for battery "A" and comparative battery "B", respectively.

TABLE 1

| | Maximum Diameter of First Welding Electrode | Number of Attachments | Occurrence Rate of Attachment |
| --- | --- | --- | --- |
| Battery "A" | 4.0 mm | 0 electrode | 0% |
| Comparative Battery "B" | 3.0 mm | 150 electrodes | 15% |

As is evident from Table 1, the percentage of the first welding electrode attaching to the negative electrode current collector plate for comparative battery "B" was high, while that for battery "A" manufactured by the manufacturing method of the present invention was 0%. This is considered to be due to improving the heat dissipation of the first welding electrode by enlarging the maximum diameter of the hollow cylindrical portion provided at the center portion of the electrode plate group as well as the maximum diameter of the first welding electrode, resulting in reduced attachment of the first welding electrode to the negative electrode current collector plate.

In the case where the first welding electrode with a maximum diameter of less than 3 mm was used and a welding current of 4 kA was applied between the first and second welding electrodes, attachment between the first welding electrode and the battery case was confirmed to occur at a high rate due to heat generated in the first welding electrode, as with the case of comparative battery Additionally, when the maximum diameter of the first welding electrode was 3 mm or less and a welding current of 2 kA was applied between the first and second welding electrodes, the first welding electrode no longer attached to the battery case. However, it was confirmed that some among the five projections may not be welded to the battery case. This is considered to be due to the inability to obtain sufficient heating because of the relative smallness of the welding current that flows between the first and second welding electrodes, thus resulting in reduced closeness of contact between the projection and the battery due to lack of penetration (weld).

[Industrial Applicability]

By the present invention, the welding electrode can be prevented from attaching to the current collector plate, when connecting the current collector plate to the battery case. Due to the above, productivity of the battery can be improved. Further, the present invention enables reliable connection between the current collector plate disposed between the battery case and the electrode plate group, and the battery case. Thus, the current collecting property can be improved. As a result, the battery manufactured by the manufacturing method of the present invention has, and can maintain, excellent battery characteristics. Additionally, the battery manufactured by the manufacturing method of the present invention can maintain favorable battery characteristics, and therefore can be suitably used as the power source for electronic equipments, power tools, electric vehicles, and the like.

The invention claimed is:

1. A manufacturing method of a cylindrical battery comprising the steps of:
    (a) producing a first electrode including a first core member in strip form and a first active material layer disposed on said first core member, with a first exposed portion provided along one side parallel to a longitudinal direction of said first core member;
    (b) producing a second electrode including a second core member in strip form and a second active material layer disposed on said second core member, with a second exposed portion provided along one side parallel to a longitudinal direction of said second core member;
    (c) spirally winding a stacked body comprising said first electrode, said second electrode, and a separator interposed therebetween to obtain an electrode plate group in which said first exposed portion of said first core member and said second exposed portion of said second core member are disposed on two end faces of said electrode plate group in a winding axis direction, respectively, and a hollow cylindrical portion is provided along the winding axis thereof;
    (d) connecting a first current collector plate to said first exposed portion of said first core member;
    (e) connecting a second current collector plate to said second exposed portion of said second core member;
    (f) housing in a cylindrical battery case, said electrode plate group to which said first current collector plate and said second current collector plate are connected, so that said second current collector plate is in contact with an inner bottom face of said cylindrical battery case; and
    (g) connecting said second current collector plate to said cylindrical battery case, wherein said second current collector plate has on a face thereof facing said inner bottom face of said cylindrical battery case, one first projection and a plurality of second projections protruding toward said inner bottom face of said cylindrical battery case, respectively, said first projection being disposed on a first part of said second current collector plate positioned correspondingly to said hollow cylindrical portion of said electrode plate group, said plurality of second projections being disposed on a second part other than said first part of said second current collector, and a height of said first projection being higher than a height of said second projection,
    a maximum diameter of said hollow cylindrical portion of said electrode plate group is ⅙ or more and ⅖ or less of a maximum diameter of said electrode plate group, the maximum diameter of said electrode plate group is 20 to 40 mm,
    said step (g) comprises a step of passing a welding electrode through said hollow cylindrical portion of said electrode plate group to come in contact with said second current collector plate and then welding together said second current collector plate and said cylindrical battery case by using said welding electrode in a state where said second current collector plate and said cylindrical battery case are in close contact, and a maximum diameter of said welding electrode is 60% or more and 100% or less of the maximum diameter of said hollow cylindrical portion of said electrode plate group, and is 4 mm or more.

2. The manufacturing method of a cylindrical battery in accordance with claim 1, wherein said second projections are disposed on a circumference of a circle whose center is at a point of intersection between the winding axis of said electrode plate group and said second current collector plate, and whose diameter is 50 to 80% of the maximum diameter of said electrode plate group, the circle being on a plane of the second electrode current collector.

3. The manufacturing method of a cylindrical battery in accordance with claim 1, wherein the difference between the height of said first projection and that of said second projection is 10 to 500 μm.

4. A cylindrical battery comprising:

a wound-type electrode plate group including a first electrode, a second electrode, and a separator interposed therebetween;

a cylindrical battery case housing said wound-type electrode plate group;

a first current collector plate connected to said first electrode;

a second current collector plate connected to said second electrode and disposed between said electrode plate group and an inner bottom face of said cylindrical battery case; and an electrolyte, wherein:

said first electrode includes a first core member in strip form and a first active material layer disposed on said first core member, a first exposed portion being provided along one side parallel to a longitudinal direction of said first core member, said second electrode includes a second core member in strip form and a second active material layer disposed on said second core member, a second exposed portion being provided along one side parallel to a longitudinal direction of said second core member, said first exposed portion and said second exposed portion are disposed on two end faces of said electrode plate group in the winding axis direction, respectively, and said electrode plate group has a hollow cylindrical portion along the winding axis thereof, said second current collector plate has, on a face thereof facing said inner bottom face of said cylindrical battery case, one first projection and a plurality of second projections protruding toward said inner bottom face of said cylindrical battery case, respectively, and said first projection is disposed on a first part of said second current collector plate positioned correspondingly to said hollow cylindrical portion of said electrode plate group, said plurality of second projections are disposed on a second part other than said first part, and said first projection and said plurality of second projections provided on said second current collector plate, respectively, are connected via a welding to said inner bottom face of said cylindrical battery case, a height of said first projection is higher than a height of said plurality of second projections, and a maximum diameter of said hollow cylindrical portion of said electrode plate group is ⅙ or more and ⅖ or less of the maximum diameter of said electrode plate group, and a maximum diameter of said electrode plate group is 20 to 40 mm.

5. The cylindrical battery in accordance with claim 4, wherein said second projections are disposed on a circumference of a circle whose center is at a point of intersection between the winding axis of said electrode plate group and said second current collector plate, and whose diameter is 50 to 80% of the maximum diameter of said electrode plate group, the circle being on a plane of the second electrode current collector.

* * * * *